(12) United States Patent
Fu et al.

(10) Patent No.: US 11,956,591 B2
(45) Date of Patent: Apr. 9, 2024

(54) ACOUSTIC OUTPUT DEVICE

(71) Applicant: SHENZHEN SHOKZ CO., LTD., Guangdong (CN)

(72) Inventors: Junjiang Fu, Shenzhen (CN); Lei Zhang, Shenzhen (CN); Xin Qi, Shenzhen (CN); Fengyun Liao, Shenzhen (CN)

(73) Assignee: SHENZHEN SHOKZ CO., LTD., Shenzhen (CN)

( * ) Notice: Subject to any disclaimer, the term of this patent is extended or adjusted under 35 U.S.C. 154(b) by 60 days.

(21) Appl. No.: 17/652,483

(22) Filed: Feb. 24, 2022

(65) Prior Publication Data
US 2022/0182754 A1    Jun. 9, 2022

Related U.S. Application Data

(63) Continuation of application No. PCT/CN2020/116319, filed on Sep. 18, 2020.

(30) Foreign Application Priority Data

Sep. 19, 2019 (CN) .......................... 201910888067.6
Sep. 19, 2019 (CN) .......................... 201910888762.2

(51) Int. Cl.
    *H04R 1/40*      (2006.01)
    *H04R 1/02*      (2006.01)
    (Continued)

(52) U.S. Cl.
    CPC .............. *H04R 1/40* (2013.01); *H04R 1/023* (2013.01); *H04R 1/1008* (2013.01);
    (Continued)

(58) Field of Classification Search
None
See application file for complete search history.

(56) References Cited

U.S. PATENT DOCUMENTS 4,322,578 A     3/1982   Selmin
5,073,945 A * 12/1991   Kageyama ............. H04R 1/227
                                                         381/186

(Continued)

FOREIGN PATENT DOCUMENTS

CN        108698541 A     10/2018
JP          H03195295 A     8/1991

(Continued)

OTHER PUBLICATIONS

International Search Report in PCT/CN2020/116319 dated Dec. 11, 2020, 6 pages.

(Continued)

*Primary Examiner* — Walter F Briney, III
(74) *Attorney, Agent, or Firm* — METIS IP LLC

(57) ABSTRACT

The present disclosure discloses an acoustic output device. The acoustic output device may include a first acoustic driver including a first diaphragm; a second acoustic driver including a second diaphragm; a control circuit electrically connected with the first acoustic driver and the second acoustic driver respectively, the control circuit provides a first electrical signal for driving a vibration of the first diaphragm, and a second electrical signal for driving a vibration of the second diaphragm, and a phase of the first electrical signal and a phase of the second electrical signal are opposite; and a housing supporting the first acoustic driver and the second acoustic driver, wherein a sound generated by the vibration of the first diaphragm is radiated outward through a first sound guide hole on the housing, and a sound generated by the vibration of the second diaphragm is radiated outward through a second sound guide hole on the housing.

17 Claims, 6 Drawing Sheets

(51) Int. Cl.
  H04R 1/10 (2006.01)
  H04R 1/22 (2006.01)
  H04R 1/24 (2006.01)
  H04R 1/28 (2006.01)
  H04R 1/34 (2006.01)
  H04R 7/04 (2006.01)
  H04R 7/18 (2006.01)
  H04R 9/02 (2006.01)
  H04R 9/06 (2006.01)

(52) U.S. Cl.
  CPC ......... *H04R 1/1075* (2013.01); *H04R 1/1091* (2013.01); *H04R 1/227* (2013.01); *H04R 1/24* (2013.01); *H04R 1/2846* (2013.01); *H04R 1/2884* (2013.01); *H04R 1/345* (2013.01); *H04R 7/04* (2013.01); *H04R 7/18* (2013.01); *H04R 9/025* (2013.01); *H04R 9/06* (2013.01)

(56) References Cited

U.S. PATENT DOCUMENTS

| | | |
|---|---|---|
| 5,147,986 A | 9/1992 | Cockrum et al. |
| 5,815,589 A | 9/1998 | Wainwright et al. |
| 10,904,667 B1* | 1/2021 | Zhong .................... G02C 11/10 |
| 2002/0061114 A1 | 5/2002 | Croft, III |
| 2017/0201822 A1* | 7/2017 | Shetye .................... H04R 1/347 |
| 2017/0353796 A1* | 12/2017 | Jeffery ................ H04R 1/1091 |
| 2018/0048960 A1 | 2/2018 | Jeffery et al. |

FOREIGN PATENT DOCUMENTS

| | | |
|---|---|---|
| JP | H0819089 A | 1/1996 |
| JP | H0993684 A | 4/1997 |
| JP | H1132388 A | 2/1999 |
| JP | 2000023285 A | 1/2000 |
| JP | 2004343286 A | 12/2004 |
| JP | 2005151236 A | 6/2005 |
| JP | 2010056588 A | 3/2010 |
| WO | 2018132772 A1 | 7/2018 |

OTHER PUBLICATIONS

Written Opinion in PCT/CN2020/116319 dated Dec. 11, 2020, 6 pages.

The Extended European Search Report in European Application No. 20865964.9 dated Sep. 5, 2022, 8 pages.

* cited by examiner

ACOUSTIC OUTPUT DEVICE

CROSS-REFERENCE TO RELATED APPLICATIONS

This application is continuation of International Application No. PCT/CN2020/116319 field on Sep. 18, 2020, which claims priority to Chinese Patent Application No. 201910888762.2, filed on Sep. 19, 2019, and Chinese Patent Application No. 201910888067.6, filed on Sep. 19, 2019, the contents of each of which are incorporated herein by reference in their entirety.

TECHNICAL FIELD

The present disclosure relates to acoustic field, and in particular, relates to an acoustic output device.

BACKGROUND

An open binaural acoustic output device is a portable audio output device that facilitates sound conduction within a specific range. Compared with conventional in-ear and over-ear headphones, the open binaural acoustic output device may have the characteristics of not blocking and not covering the ear canal, allowing a user to obtain sound information of an ambient environment while the user is listening to music, improving safety and comfort of the user. Due to the use of an open structure, a sound leakage of the open binaural acoustic output device may be more serious than that of conventional headphones. At present, it is common practice in the industry to use sound radiation on the front side and the back side of a loudspeaker to construct a dual sound source, construct a specific sound field, and adjust a sound pressure distribution, to reduce sound leakage. This method can reduce the sound leakage to a certain extent, but it still has some limitations. For example, since sound waves emitted by the loudspeaker are sound waves radiated from the front side of the diaphragm and the back side of the diaphragm, the sound waves radiated from the back side of the diaphragm needs to pass through a cavity formed by a diaphragm and an electromagnetic structure (e.g., a magnetic guide plate), and then radiate to the outside through an opening on the electromagnetic structure, resulting in a mismatch between an acoustic impedance of the front side of the loudspeaker and an acoustic impedance of the back side of the loudspeaker. As a result, the sound radiation on the front side and the back side cannot form an effective dual sound source (especially in a medium-high frequency range), thus the sound leakage may be increased.

Therefore, it is desired to provide an acoustic output device that can provide a more effective dual sound source, while achieving an effect of increasing a volume of a sound sent to a user and reducing sound leakage.

SUMMARY

One aspect of the present disclosure may provide an acoustic output device. The acoustic output device may include: a first acoustic driver, the first acoustic driver may include a first diaphragm; a second acoustic driver, the second acoustic driver may include a second diaphragm; a control circuit, the control circuit may electrically connected with the first acoustic driver and the second acoustic driver respectively, the control circuit may provide a first electrical signal for driving a vibration of the first diaphragm, and a second electrical signal for driving a vibration of the second diaphragm, and a phase of the first electrical signal and a phase of the second electrical signal may be opposite; and a housing, the housing may support the first acoustic driver and the second acoustic driver, wherein a sound generated by the vibration of the first diaphragm may be radiated outward through a first sound guide hole on the housing, and a sound generated by the vibration of the second diaphragm may be radiated outward through a second sound guide hole on the housing.

In some embodiments, the first acoustic driver may include a first magnetic circuit structure. The second acoustic driver may include a second magnetic circuit structure. When the first diaphragm is driven by the first electric signal to vibrate toward the first magnetic circuit structure, the second diaphragm may be driven by the second electrical signal to vibrate away from the second magnetic circuit structure.

In some embodiments, the housing may at least include a first cavity and a second cavity, wherein the first cavity may be not in fluid communication with the second cavity. The first acoustic driver may be located in the first cavity. The second acoustic driver may be located in the second cavity.

In some embodiments, the first cavity may be the same as the second cavity, wherein a front cavity of the first acoustic driver may be the same as a front cavity of the second acoustic driver, a rear cavity of the first acoustic driver may be the same as a rear cavity of the second acoustic driver.

In some embodiments, the first sound guide hole may be in fluid communication with the first cavity, the second sound guide hole may be in fluid communication with the second cavity. The first acoustic driver may emit the sound from the first sound guide hole, the second acoustic driver may emit the sound from the second sound guide hole, wherein a phase of the sound emitted by the first acoustic driver from the first sound guide hole may be opposite to a phase of the sound emitted by the second acoustic driver from the second sound guide hole.

In some embodiments, the first sound guide hole and the second sound guide hole may be located on adjacent side walls or opposite side walls of the housing.

In some embodiments, the control circuit may generate an audio signal. The first acoustic driver and the second acoustic driver may receive the audio signal in opposite polarities, respectively, to obtain the first electrical signal and the second electrical signal, respectively.

In some embodiments, the first acoustic driver and the second acoustic driver may be electrically connected with the control circuit in a same polarity, respectively, wherein the first acoustic driver or the second acoustic driver may be electrically connected with the control circuit through a phase inverter circuit.

In some embodiments, a difference between an amplitude frequency response of the first acoustic driver and an amplitude frequency response of the second acoustic driver in a medium-high frequency range may be not greater than 6 dB.

In some embodiments, the medium-high frequency range may be within 200 Hz to 20 kHz.

In some embodiments, a difference between the amplitude frequency response of the first acoustic driver and the amplitude frequency response of the second acoustic driver in at least a portion of a low frequency range may be not less than 10 dB.

In some embodiments, an acoustic path from one of the first acoustic driver and the second acoustic driver with a larger amplitude frequency response in the low frequency range to an ear of a user may be smaller.

In some embodiments, a rear cavity of the first acoustic driver and a rear cavity of the second acoustic driver may include at least one tuning hole.

In some embodiments, the acoustic output device may further include a third acoustic driver. The third acoustic driver may include a third diaphragm. The control circuit may provide a third electrical signal for driving a vibration of the third diaphragm to generate a low-frequency sound. The low-frequency sound may be radiated outward through a third sound guide hole and a fourth sound guide hole on the housing.

In some embodiments, the third sound guide hole and the fourth sound guide hole may be located on adjacent side walls or opposite side walls of the housing.

In some embodiments, the third sound guide hole and the fourth sound guide hole may be used to guide a sound of the front cavity of the third acoustic driver and a sound of the rear cavity of the third acoustic driver, respectively.

In some embodiments, a phase of a sound emitted from one of the third sound guide hole and the fourth sound guide hole which is closer to an ear of a user may be the same as a phase of a sound emitted from one of the first sound guide hole and the second sound guide hole which is closer to the ear of the user.

In some embodiments, a sound path difference between a sound emitted from the third sound guide hole to an ear of a user and a sound emitted from the fourth sound guide hole to the ear of the user may be greater than a sound path difference between a sound emitted from the first sound guide hole to the ear of the user and a sound emitted from the second sound guide hole to the ear of the user.

In some embodiments, a physical size of the third acoustic driver may be greater than a physical size of the first acoustic driver or a physical size of the second acoustic driver.

In some embodiments, an area of the third diaphragm of the third acoustic driver may be greater than an area of the first diaphragm of the first acoustic driver or an area of the second diaphragm of the second acoustic driver.

BRIEF DESCRIPTION OF THE DRAWINGS

The present disclosure is further illustrated in terms of exemplary embodiments, and these exemplary embodiments are described in detail with reference to the drawings. These embodiments are not restrictive. In these embodiments, the same number indicates the same structure, wherein.

DETAILED DESCRIPTION

Figure 1:
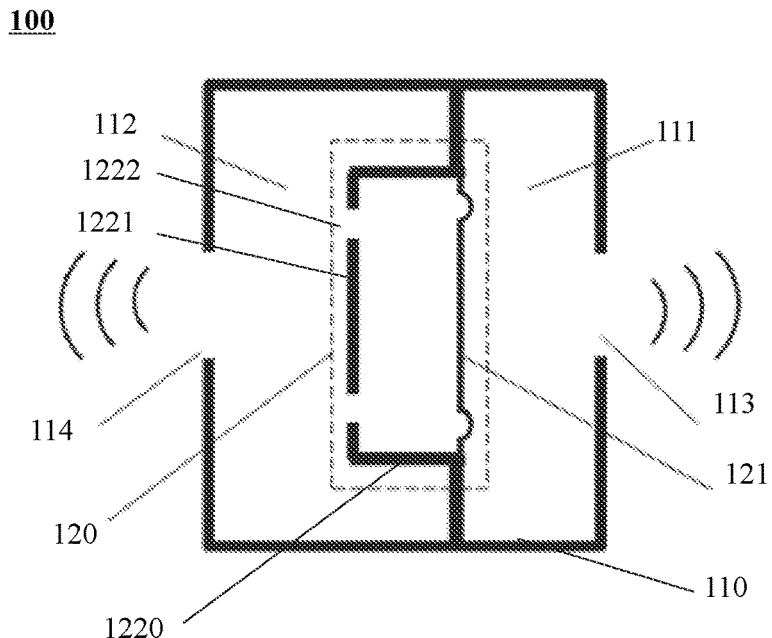
FIG. 1 is a structure diagram illustrating an acoustic output device according to some embodiments of the present disclosure.

In order to illustrate the technical solutions related to the embodiments of the present disclosure, brief introduction of the drawings referred to in the description of the embodiments is provided below. Obviously, drawings described below are only some examples or embodiments of the present disclosure. Those having ordinary skills in the art, without further creative efforts, may apply the present disclosure to other similar scenarios according to these drawings. Unless stated otherwise or obvious from the context, the same reference numeral in the drawings refers to the same structure and operation.

It will be understood that the terms "system," "engine," "unit," and/or "module" used herein are one method to distinguish different components, elements, parts, sections, or assemblies of different levels. However, the terms may be displaced by other expressions if they may achieve the same purpose.

As shown in the present disclosure and claims, unless the context clearly indicates exceptions, the words "a," "an," "one," and/or "the" do not specifically refer to the singular, but may also include the plural. The terms "including" and "comprising" only suggest that the steps and elements that have been clearly identified are included, and these steps and elements do not constitute an exclusive list, and the method or device may also include other steps or elements.

The flowcharts used in the present disclosure may illustrate operations executed by the system according to embodiments in the present disclosure. It should be understood that a previous operation or a subsequent operation of the flowcharts may not be accurately implemented in order. Conversely, various operations may be performed in inverted order, or simultaneously. Moreover, other operations may be added to the flowcharts, and one or more operations may be removed from the flowcharts.

Figure 2:
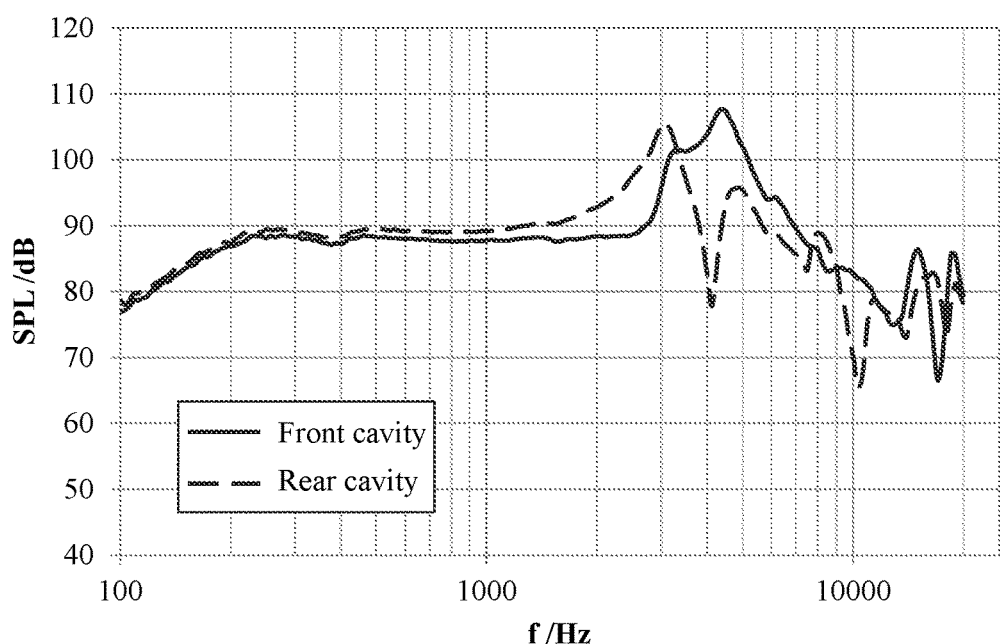
FIG. 2 is a schematic diagram illustrating a far-field sound leakage of an acoustic driver provided in FIG. 1.

FIG. 1 is a structure diagram illustrating an acoustic output device according to some embodiments of the present disclosure. An acoustic output device 100 may include an internally hollow housing 110, and an acoustic driver 120 disposed in an internal cavity of the housing 110. The acoustic driver 120 may include a diaphragm 121 and a magnetic circuit structure 1220. The acoustic driver 120 may also include a voice coil (not shown in FIG. 1). The voice coil may be fixed on a side of the diaphragm 121 facing the magnetic circuit structure 1220 and located in a magnetic field formed by the magnetic circuit structure 1220. When the voice coil is energized, the voice coil may vibrate under the action of the magnetic field and drive the diaphragm 121 to vibrate, and a sound may be generated. For convenience of description, a side of the diaphragm 121 away from the magnetic circuit structure 1220 (i.e., the right side of the diaphragm 121 shown in FIG. 1) may be regarded as a front side of the acoustic driver 120, and a side of the magnetic circuit structure 1220 away from the diaphragm 121 (i.e., the left side of the magnetic circuit structure 1220 shown in FIG. 1) may be regarded as a back side of the acoustic driver 120. A vibration of the diaphragm 121 may cause the acoustic driver 120 to radiate sound outward from the front side and the back side of the acoustic driver 120, respectively. The front side of the acoustic driver 120 or the diaphragm 121, and the housing 110 may form a front cavity 111. The back side of the acoustic driver 120 and the housing 110 may form a rear cavity 112. The front side of the acoustic driver 120 may radiate sound to the front cavity 111, and the back side of the acoustic driver 120 may radiate sound to the rear cavity 112. In some embodiments, the housing 110 may also include a first sound guide hole 113 and a second sound guide hole 114. The first sound guide hole 113 may be in fluid communication with the front cavity 111, and the second sound guide hole 113 may be in fluid communication with the rear cavity 112. The sound generated from the front side of the acoustic driver 120 may be propagated to the outside through the first sound guide hole 113, and the sound generated from the back side of the acoustic driver 120 may be propagated to the outside through the second sound guide hole 114. In some embodiments, the magnetic circuit structure 1220 may include a magnetic guide plate 1221 arranged opposite to the diaphragm. The magnetic guide plate 1221 may be provided with at least one sound guide hole 1222 (also be referred to as a pressure relief hole) for guiding and propagating the sound generated by the vibration of the diaphragm 121 from the back side of the acoustic driver 120 to the outside through the rear cavity 112. The acoustic output device 100 may form a dual sound source (or a multiple-sound source) that is similar to a dipole structure through the sound radiation from the first sound guide hole 113 and the second sound guide hole 114, and a specific sound field with a certain directionality may be generated. Since the sound generated from the front side of the acoustic driver 120 is directly radiated outward through the first sound guide hole 113 on the front cavity 111, the sound generated from the back side of the acoustic driver 120 needs to first pass through the cavity formed by the diaphragm 121 and the magnetic circuit structure 1220, then pass through the sound guide hole 1222 on the magnetic circuit structure 1220 (e.g., the magnetic guide plate 1221) and the second sound guide hole 114 on the rear cavity 112, and further be radiated to the outside. As a result, there may be a large difference between an acoustic impedance of the front side of the acoustic driver 120 and an acoustic impedance of the back side of the acoustic driver 120, so that a difference between an amplitude of the sound emitted from the first sound guide hole 113 and an amplitude of the sound emitted from the second sound guide hole 114 of the acoustic output device 100 is relatively large. It is unable to form an effective dual sound source (especially at a medium-high frequency range), resulting in an increase in sound leakage. FIG. 2 is a schematic diagram illustrating a far-field sound leakage of an acoustic driver provided in FIG. 1. As shown in FIG. 2, the front cavity 111, the rear cavity 112, and the cavity formed by the diaphragm 121 and the magnetic circuit structure 1220 in the acoustic output device 100 may cause the sound in the front cavity 111 ("front cavity" in FIG. 2) and the sound in the rear cavity 112 ("rear cavity" in FIG. 2) of the acoustic output device 100 to form a resonant peak in a medium frequency or a medium-high frequency (e.g., 2000 Hz-4000 Hz). After the resonance peak, attenuation degrees of the frequency response of the front cavity 111 and the rear cavity 112 may be different (the frequency response of the rear cavity 112 may be weakened faster), resulting in a poor frequency response of a dipole-like structure formed by the acoustic output device 100 at a relatively high frequency (e.g., the first sound guide hole 113 and the second sound guide hole 114 radiate sounds with a relatively large amplitude difference). The sound leakage of the acoustic output device 100 in the far field is not well suppressed.

In order to further improve the sound output effect of the acoustic output device 100, the present disclosure may provide another or more acoustic output devices including at least two acoustic drivers. When a user wears the acoustic output device, the acoustic output device may be located at least on one side of the head of the user head, close to but not blocking the ear of the use. The acoustic output device may be worn on the head of the user (e.g., a non-in-ear open headset worn in a form of glasses, a headband, or other structures), or on other parts of the body of the user (e.g., a neck/shoulder area of the user), or placed near the ear of the user ear by other means (e.g., holding in hands of the user). In some embodiments, the acoustic output device may include a first acoustic driver, a second acoustic driver, a control circuit, and a housing. The first acoustic driver may include a first diaphragm. The second acoustic driver may include a second diaphragm. The control circuit may be electrically connected to the first acoustic driver and the second acoustic driver, respectively. The control circuit may provide a first electrical signal for driving a vibration of the first diaphragm, and a second electrical signal for driving a vibration of the second diaphragm. In some embodiments, when an amplitude of the first electrical signal and an amplitude of the second electrical signal are the same, and a phase of the first electrical signal and a phase of the second electrical signal are opposite (e.g., the first acoustic driver and the second acoustic driver are respectively electrically connected to the control circuit in opposite polarities and receive the same electrical signal provided by the control circuit), the first diaphragm and the second diaphragm may generate a set of sounds in opposite phases. Further, the housing may support the first acoustic driver and the second acoustic driver, wherein the sound generated by the vibration of the first diaphragm may be radiated outward through the first sound guide hole on the housing, and the sound generated by the vibration of the second diaphragm may be radiated outward through the second sound guide hole on the housing. For convenience of description, the sound generated by the first diaphragm may refer to the sound generated by the front side of the first acoustic driver, and the sound generated by the second diaphragm may refer to the sound generated by the front side of the second acoustic driver. When the sound generated by the vibration of the first diaphragm and the sound generated by the vibration of the second diaphragm are directly radiated outward through the corresponding first sound guide hole and the corresponding second sound guide hole, the first sound guide hole and the second sound guide hole may be approximately regarded as a dual sound source (e.g., a two-point sound source). Compared with the structures described in FIG. 1, the sound generated by the first diaphragm and the sound generated by the second diaphragm may both not need to be radiated outward through the magnetic circuit structure of the acoustic driver, which may ensure that the acoustic impedance of the front side of the first acoustic driver is basically the same as the acoustic impedance of the front side of the second acoustic driver. Thus, the sounds emitted from the first sound guide hole and the second sound guide hole may form an effective dual sound source. In some embodiments, the frequency response of the first acoustic driver may be the same as or similar to the frequency response of the second acoustic driver in a medium-high frequency band. Since the phase of the first electrical signal for driving the vibration of the first diaphragm is opposite to the phase of the second electrical signal for driving the vibration of the second diaphragm, in the far field (e.g., a position far away from the ear of the user), especially in the medium-high frequency band (e.g., 200 Hz-20 kHz), the sound emitted from the first sound guide hole may offset the sound emitted from the second sound guide hole, which may suppress the sound leakage of the acoustic output device to a certain extent. At the same time, the sound generated by the acoustic output device can be prevented from being heard by others near the user.

It should be noted that, in some embodiments, the first acoustic driver and the second acoustic driver may be the same or similar acoustic drivers, so that the amplitude frequency response of the first acoustic driver and the amplitude frequency response of the second acoustic driver in a full frequency band are the same or similar. In some embodiments, the first acoustic driver and the second acoustic driver may be different acoustic drivers. For example, the frequency response of the first acoustic driver and the frequency response of the second acoustic driver may be the same or similar in a medium-high frequency band, while the frequency response of the first acoustic driver and the frequency response of the second acoustic driver may be different in a low frequency band. Detailed descriptions of the first acoustic driver and the second acoustic driver may refer to FIG. 3, FIG. 4, and descriptions thereof. In some alternative embodiments, the sound generated by the vibration of the first/second diaphragm may also refer to the sound generated by the back side of the first/second acoustic driver, and it is only necessary to ensure that acoustic impedances between the two acoustic drivers and their corresponding sound guide holes are the same or basically the same.

Figure 3:
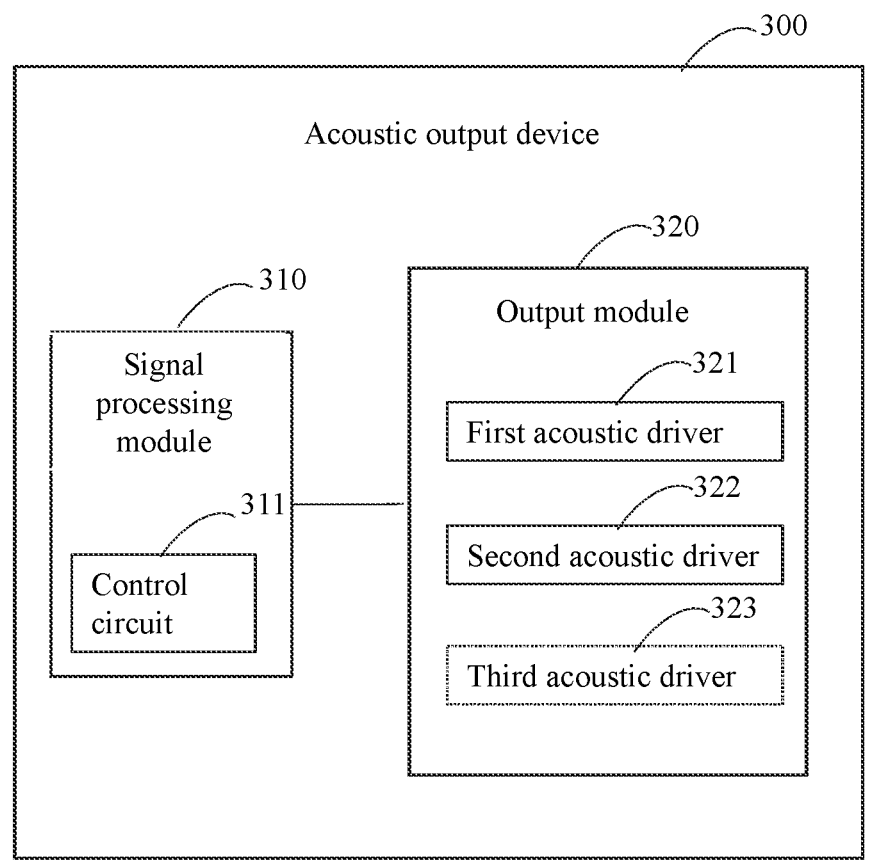
FIG. 3 is a block diagram illustrating an acoustic output device according to some embodiments of the present disclosure.

FIG. 3 is a block diagram illustrating an exemplary acoustic output device according to some embodiments of the present disclosure. As shown in FIG. 3, an acoustic output device 300 may include a signal processing module 310 and an output module 320.

The signal processing module 310 may include a control circuit 311. The control circuit 311 may be configured to receive an initial acoustic signal, process the initial acoustic signal, and output a corresponding control signal (also referred to as an audio signal), that is, control the generation of a sound wave and the output of a signal. In some embodiments, the initial acoustic signal may be an electrical signal converted from the sound of external environment by one or more acoustoelectric conversion devices (e.g., a microphone). For example, the acoustic output device 300 may include one or more air or bone guided microphones to collect and convert air vibration or any other perceptible mechanical vibrations into electrical signals, and send the electrical signals to the signal processing module 310. In some embodiments, the acoustic output device may obtain the initial acoustic signal from one or more signal sources. The one or more signal sources may be an internal device (e.g., a memory) of the acoustic output device 300, or an external device of the acoustic output device 300. The external device may send a signal containing sound information to the acoustic output device 300 in a wired or wireless manner.

The output module 320 may include one or more electroacoustic conversion devices (i.e., an acoustic driver). The acoustic driver in the output module 320 may be electrically connected with the control circuit 311, and configured to generate sound waves according to the control signal. In some embodiments, the output module 320 may include a first acoustic driver 321 and a second acoustic driver 322. The control signal may include a first electrical signal and a second electrical signal, wherein the first electrical signal may be configured to drive the first acoustic driver 321 to make sound, and the second electrical signal may be configured to drive the second acoustic driver 322 to make sound. Specifically, the first acoustic driver 321 may include a first diaphragm and a first magnetic circuit structure, and the second acoustic driver 322 may include a second diaphragm and a second magnetic circuit structure, wherein the first electric signal may drive a vibration of the first diaphragm, and the second electric signal may drive a vibration of the second diaphragm.

In some embodiments, a phase of the first electric signal and a phase of the second electric signal may be opposite. When the first diaphragm is driven by the first electric signal to vibrate toward the first magnetic circuit structure, the second diaphragm is driven by the second electrical signal to vibrate away from the second magnetic circuit structure, such that a phase of the sound generated by the first acoustic driver 321 and a phase of the sound generated by the second acoustic driver 322 may be opposite.

In some embodiments, the first acoustic driver 321 and the second acoustic driver 322 may be electrically connected with the control circuit 311 in opposite polarities, respectively. At this time, the first acoustic driver 321 and the second acoustic driver 322 may be connected in parallel and then connected in series with the control circuit 311. For ease of understanding, the opposite polarities may be described as that a positive pole of the first acoustic driver 321 is connected to an output terminal of the control circuit 311, and a negative pole of the second acoustic driver 322 is connected to the output terminal of the control circuit 311. The control circuit 311 may generate a set of audio signals. When the audio signals are transmitted to input terminals of the two acoustic drivers, respectively (i.e., the positive pole of the first acoustic driver 321 and the negative pole of the second acoustic driver), the two acoustic drivers may obtain the first electrical signal and the second electrical signal in opposite polarities, respectively. In some alternative embodiments, the first acoustic driver 321 and the second acoustic driver 322 may be electrically connected with the signal processing module 310 in a same polarity, respectively. In order to make the two acoustic drivers generate two sets of sounds in opposite phases, the signal processing module 310 may output two sets of audio signals in opposite phases. Specifically, a phase inverter circuit may be added between the control circuit 311 and the first acoustic driver 321 or the second acoustic driver 322. The phase inverter circuit may be configured to invert the phase of the audio signal with 180°. At this time, the audio signal generated by the control circuit 311 may be transmitted to the first acoustic driver 321 and the second acoustic driver 322 in positive phase and negative phase, respectively, so that the two acoustic drivers may obtain the first electrical signal and the second electrical signal in opposite polarities, respectively.

In some embodiments, the acoustic output device 300 may also include a housing. The housing may support the first acoustic driver 321 and the second acoustic driver 322. The housing may be provided with at least one first sound guide hole and at least one second sound guide hole. The sound generated by the vibration of the first diaphragm of the first acoustic driver 321 may be radiated outward through the at least one first sound guide hole. The sound generated by the vibration of the second diaphragm of the second acoustic driver 322 may be radiated outward through the at least one second sound guide hole. The first sound guide hole and the second sound guide hole may be located in a front cavity of the first acoustic driver 321 and a front cavity of the second acoustic driver 322, respectively. The first sound guide hole and the second sound guide hole may be located in a rear cavity of the first acoustic driver 321 and a rear cavity of the second acoustic driver 322, respectively. Since the phases of the first electrical signal and the second electrical signal are opposite, and the phases of the sound emitted from the first sound guide hole and the sound emitted from the second sound guide hole are opposite, the sound emitted from the first sound guide hole and the sound emitted from the second sound guide hole may offset with each other in the far field (e.g., far from the ear of the user), which may reduce the sound leakage volume of the acoustic output device 300.

An acoustic driver may be an element that can receive an electrical signal and convert the electrical signal into a sound signal for output. In some embodiments, the first acoustic driver 321 and/or the second acoustic driver 322 may be a speaker that can output air guided sound waves. In other alternative embodiments, the first acoustic driver 321 and/or the second acoustic driver 322 may also be a speaker that can output sound waves conducted by a solid medium (e.g., bone conduction sound waves). In some embodiments, according to the frequency of the output sound, types of acoustic drivers may include a low frequency (e.g., 20 Hz to 200 Hz) acoustic driver, a medium-high frequency (e.g., 200 Hz to 8 kHz) acoustic driver, a high frequency (e.g., greater than 8 kHz) acoustic driver, or any combination thereof. Of course, the low frequency and the high frequency may only represent an approximate range of frequencies. In different application scenarios, there may be different division methods. For example, a frequency division point may be determined, the low frequency may represent a frequency below the frequency division point, and the high frequency may represent a frequency above the frequency division point. The frequency division point may be any value within an audible range of human ears, such as 500 Hz, 600 Hz, 700 Hz, 800 Hz, 1000 Hz, etc. In some embodiments, according to the principle, the acoustic driver may include but is not limited to a moving coil driver, a moving iron driver, a piezoelectric driver, an electrostatic driver, a magneto strictive driver, or the like. In some embodiments, the first acoustic driver 321 and the second acoustic driver 322 may be same acoustic drivers. For example, the first acoustic driver 321 and the second acoustic driver 322 may be acoustic drivers of a same model manufactured by a same manufacturer. As another example, the first acoustic driver 321 and the second acoustic driver 322 may both be medium-high frequency speakers and may have the same amplitude frequency response in the medium-high frequency band. In this case, since the phases of the first electrical signal and the second electrical signal are opposite, the phases of sounds output from the front sides (or the back sides) of the first acoustic driver 321 and the second acoustic driver 322 may be opposite. In this case, the sound waves generated from the front sides of the first acoustic driver 321 and the second acoustic driver 322 may be radiated to the outside through the corresponding sound guide holes (e.g., the first sound guide hole and the second sound guide hole), and the sound emitted from the corresponding sound guide holes may be regarded as two point sound sources. The two point sound sources may generate medium-high frequency sound in opposite phases, which may inversely offset in the far field, and the sound leakage volume in the medium-high frequency band in the far field may be reduced. In some embodiments, in order to prevent the low-frequency sound emitted by the low frequency acoustic driver of the acoustic output device from being distorted, a physical size of the low frequency acoustic driver may be greater than a physical size of the medium-high frequency acoustic driver. It should be understood that an area of a diaphragm of the low frequency acoustic driver may be larger than an area of a diaphragm of the medium-high frequency acoustic driver. It should be noted that the area of the diaphragm may refer to an effective area of the diaphragm during a vibration process. In other embodiments, an output effect of the low frequency acoustic driver in the low frequency may be ensured by changing a diaphragm structure or a diaphragm material.

In some embodiments, in order to make the acoustic output device suitable for more scenarios, the first acoustic driver 321 and the second acoustic driver 322 may be different acoustic drivers. For example, the first acoustic driver 321 and the second acoustic driver 322 may have different amplitude frequency responses in the low frequency band, while the first acoustic driver 321 and the second acoustic driver 322 may have the same or similar amplitude frequency responses in the medium-high frequency band. In the medium-high frequency band, since the amplitude frequency responses of the first acoustic driver 321 and the second acoustic driver 322 are basically the same, according to the first electrical signal and the second electrical signal, a dual sound source with opposite phases in the medium-high frequency band may be constructed to reduce the sound leakage volume in the medium-high frequency band in the far field. In the low frequency band, since the amplitude frequency responses of the first acoustic driver 321 and the second acoustic driver 322 are different or have a large difference, driven by the first electrical signal and the second electrical signal, although the phases of the low-frequency sounds generated by the first acoustic driver 321 and the second acoustic driver 322 are opposite, the intensities of the low-frequency sounds generated by the first acoustic driver 321 and the second acoustic driver 322 are quite different. Therefore, the effect of sound offset may be weak, and loud low-frequency near-field sound can still be heard by the user's ear.

In some scenarios, the signal processing module 310 may include a filter/filter group (also be referred to as a filter system). The filter/filter group may adaptively change the first electrical signal and/or the second electrical signal input into the first acoustic driver 321 and/or the second acoustic driver 322 according to an actual situation. For example, the filter/filter group may filter out a low frequency signal in the first electrical signal, so that the first acoustic driver 321 can only output a sound in the medium-high frequency band. At this time, since the low-frequency sound generated by the second acoustic driver 322 based on the second electrical signal cannot be offset at the ear of the user, the acoustic output effect of the acoustic output device in the low frequency band may be improved.

In some embodiments, in order to improve the acoustic output effect of the acoustic output device in the low frequency band, the output module 320 may also include a third acoustic driver 323. The third acoustic driver 323 may include a third diaphragm. The third diaphragm may be driven by a third electrical signal to vibrate. In some embodiments, the third acoustic driver 323 may be a low frequency acoustic driver. The filter/filter group may filter out a medium-high frequency signal in the control signal, and send a remaining low frequency signal to the third acoustic driver 323. In this way, the third acoustic driver 323 may only output a sound in the low frequency band, which may improve the acoustic output effect of the acoustic output device 300 in the low frequency band. In some embodiments, in order to make the acoustic output device have a better acoustic output effect in a high noise environment, the third acoustic driver 323 may output a sound having the same phase or a specific phase difference (e.g., an absolute value of the phase difference is less than 90°) with the sound generated by the first acoustic driver 321 or the second acoustic driver 322. At this time, the low frequency or medium-high frequency sound output by the third acoustic driver 323 may be used as a compensation for the low frequency or medium-high frequency sound heard by the user, making it easier for the user to hear the sound emitted by the acoustic output device in the high noise environment.

In some embodiments, the control circuit 311 may also include a switch for controlling a switching state of the filter/filter group, the phase inverter circuit, and/or the acoustic driver. The switch may control the acoustic output device to adjust the sound according to different scenarios. For example, in the high noise environment, the sound leakage in the far field may not be easily heard by others near the user. When the first acoustic driver 321 and the second acoustic driver 322 are both medium-high frequency acoustic drivers, the phases of the first electrical signal and the second electrical signal may be adjusted to be the same by closing the phase inverter circuit. Thus, the first acoustic driver 321 and the second acoustic driver 322 may generate and output sound with the same phase in the medium-high frequency band, and the output volume of the acoustic output device in the medium-high frequency band may be increased. As another example, in the high noise environment, when the first acoustic driver 321 and the second acoustic driver 322 are medium-high frequency acoustic drivers, and the third acoustic driver 323 is a low frequency acoustic driver, the filter/filter group electrically connected with the low frequency acoustic driver may be turned off, so that the low frequency acoustic driver can also generate sound waves in the medium-high frequency band according to the control signal, and the volume of the medium-high frequency band output by the acoustic output device can be increased. In other embodiments, a frequency division may be performed on the control signal (e.g., the third electrical signal) for controlling the third acoustic driver 323 by controlling the filter/filter group of the third acoustic driver 323. The signal processing module 310 may adjust the phase of the low frequency signal obtained after the frequency division, so that a phase of the low-frequency sound wave generated by the third acoustic driver 323 is opposite to the low frequency noise in the external noise, to realize an effect of actively reducing low frequency noise. In addition, the medium-high frequency signal obtained after the frequency division may make the third acoustic driver 323 generate a medium-high frequency sound. The medium-high frequency sound may have the same phase as or have a small phase difference (e.g., not greater than 90°) with the medium-high frequency sound generated by the first acoustic driver 321 and the second acoustic driver 322, to achieve an effect of noise reduction in the low frequency band and an effect of increasing the output volume in the high frequency band at the same time.

In some embodiments, in order to adjust the output features (e.g., a frequency, a phase, an amplitude, etc.) of a sound wave, a corresponding control signal may be processed in the signal processing module 310, so that the sound wave output by each acoustic driver contains a specific frequency component, respectively. A structure or an arrangement of each component in the output module 320 may be set and optimized, so that the sound wave output by the each acoustic driver contains a specific frequency component, respectively. When features of the output sound wave are changed by adjusting the signal processing module 310, several filters/filter groups may be set to process the control signal to output signals containing different frequency components, and then output the signals to a corresponding output module 320 for sound output. The filters/filter groups may include but are not limited to an analog filter, a digital filter, a passive filter, an active filter, or the like.

It should be noted that in some embodiments of the present disclosure, a low frequency may refer to a frequency band approximately between 20 Hz and 200 Hz, and a medium-high frequency may refer to a frequency band approximately between 200 Hz and 20 kHz. Preferably, the medium-high frequency may refer to a frequency band approximately between 400 Hz and 10 kHz. More preferably, the medium-high frequency may refer to a frequency band approximately between 600 Hz and 8 kHz. In other embodiments, the frequency band may also be divided into a low frequency band, a medium-low frequency band, a medium frequency band, a medium-high frequency band, a high frequency band, or the like. A person skilled in the art should be understood that the above divisions of the frequency band are only given as an example to give an approximate interval. The definition of the frequency band may change with different industries, different application scenarios, or different classification standards. For example, in other application scenarios, the low frequency may refer to a frequency band approximately between 20 Hz and 80 Hz, the medium-low frequency may refer to a frequency band approximately between 80 Hz and 160 Hz, the medium frequency may refer to a frequency band approximately between 160 Hz and 2 kHz, the medium-high frequency may refer to a frequency band approximately between 2 kHz and 8 kHz, and the high frequency may refer to a frequency band approximately between 8 kHz and 20 kHz. More descriptions of the specific structure and the distribution of the first acoustic driver 321, the second acoustic driver 322, the third acoustic driver 323, and their components may refer to FIG. 1, FIG. 4, and descriptions thereof.

Figure 4:
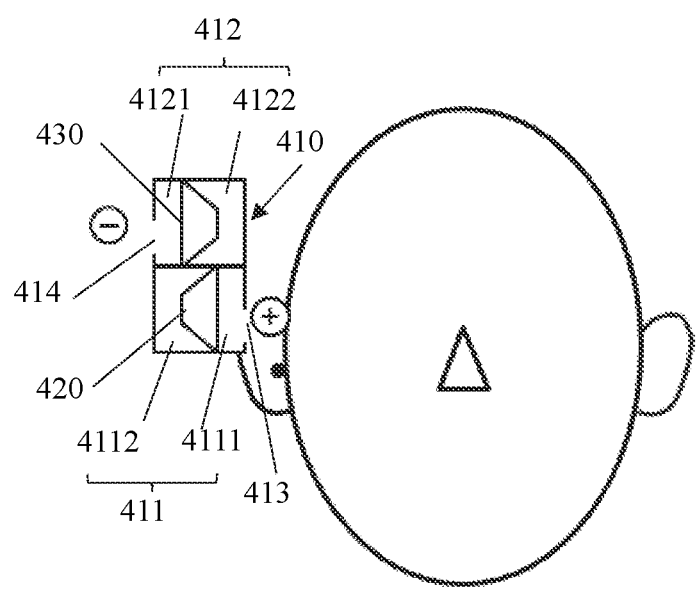
FIG. 4 is a structure diagram illustrating an acoustic output device according to some embodiments of the present disclosure.

FIG. 4 is a structure diagram illustrating an exemplary acoustic output device according to some embodiments of the present disclosure. As shown in FIG. 4, the acoustic output device 400 may include an internally hollow housing 410, a first acoustic driver 420 and a second acoustic driver 430 disposed in the housing 410.

In some embodiments, the acoustic output device 400 may be worn on the body of the user (e.g., the head, the neck, or the upper torso of the human body) through the housing 410. The housing 410, the first acoustic driver 420, and the second acoustic driver 430 may be close to but not block an ear canal, so that the ear of the user remains open, and the user can not only hear a sound output by the acoustic output device 400, but also hear a sound of an external environment. For example, the acoustic output device 400 may be arranged around or partially around the ear of the user and may transmit the sound through an air conduction or a bone conduction.

The housing 410 may be used to be worn on the body of the user body and may support an acoustic driver (e.g., the first acoustic driver 420 and the second acoustic driver 430). In some embodiments, the housing 410 may be a closed housing structure with a hollow interior, and the acoustic driver may be located inside the housing 410. In some embodiments, the acoustic output device 400 may be combined with a product such as glasses, a headset, a headmounted display device, an AR/VR helmet, or the like. In this case, the housing 410 may be fixed in the vicinity of the ear of the user by means of hanging or clamping. In some alternative embodiments, the housing 410 may be provided with a hook. A shape of the hook may match a shape of an auricle, so that the acoustic output device 400 can be independently worn on the ear of the user through the hook. The acoustic output device 400 which is independently worn on the user may be connected to a signal source (e.g., a computer, a mobile phone, or other mobile devices) in a wired or wireless (e.g., Bluetooth) manner. For example, the acoustic output devices 400 at the left ear and the right ear may both be directly connected to and communicated with the signal source in a wireless manner. As another example, the acoustic output devices 400 at the left ear and the right ear may include a first output device and a second output device, wherein the first output device may be connected to and communicated with the signal source, and the second output device may be connected to the first output device in a wireless manner. The first output device and the second output device may realize a synchronization of audio playback via one or more synchronization signals. The manner of wireless connection may include but is not limited to, a Bluetooth, a local area network, a wide area network, a wireless personal area network, a near field communication, or the like, or any combination thereof.

In some embodiments, the housing 410 may be a housing structure having a shape adapted to a human ear, e.g., an annulus shape, an oval shape, a polygonal shape (regular or irregular), a U-shape, a V-shape, a semi-circular shape, so that the housing 410 can be directly attached to the ear of the user. In some embodiments, the housing 410 may also include one or more fixed structures. The fixing structure may include an ear hook, a head beam, or an elastic band, so that the acoustic output device 400 can be fixed on the user better, and prevent the acoustic output device 400 from falling during the user use the acoustic output device 400. Merely by way of example, for example, the elastic band may be a headband. The headband may be configured to be worn around a head area. As another example, the elastic band may be a neckband configured to be worn around a neck/shoulder area. In some embodiments, the elastic band may be a continuous band and may be elastically stretched to fit over the head of the user. At the same time, the elastic band may also exert pressure on the head of the user so that the acoustic output device 100 can be firmly fixed on a specific position of the head of the user. In some embodiments, the elastic band may be a discontinuous band. For example, the elastic band may include a rigid portion and a flexible portion, wherein the rigid portion may be made of a rigid material (e.g., a plastic or a metal). The rigid portion may be fixed with the housing 410 of the acoustic output device 400 via a physical connection (e.g., a snap connection, a screw connection, etc.). The flexible portion may be made of an elastic material (e.g., a cloth, a composite material, or/and a neoprene).

In some embodiments, the acoustic driver (e.g., the first acoustic driver 420 and the second acoustic driver 430) may include a diaphragm and a magnetic circuit structure. More description of the structures of the first acoustic driver 420 and the second acoustic driver 430 may refer to FIG. 1 of the present disclosure and descriptions thereof, and details are not described herein. When the diaphragm of the acoustic driver driven by the control signal (e.g., the first electrical signal and the second electrical signal) to vibrate, sounds may be emitted from the front side and the back side of the diaphragm, respectively. In some embodiments, the housing 410 may include a first cavity 411 and a second cavity 412, wherein the first cavity 411 may be not in fluid communication with the second cavity 412, that is, a baffle may be provided in the housing 410 to isolate the first cavity 411 from the second cavity 412. In other embodiments, the housing 410 may include a first housing and a second housing. The first housing may be fixedly connected with the second housing. The first cavity 411 may be arranged inside the first cavity 411, and the second cavity 412 may be arranged inside the second cavity 412. The first acoustic driver 420 may be located in the first cavity 411. A front side of the first acoustic driver 420 and the housing 410 may form a first front cavity 4111. A back side of the first acoustic driver 420 and the housing structure 420 may form a first rear cavity 4112. The front side of the first acoustic driver 420 may radiate the sound toward the first front cavity 4111. The back side of the first acoustic driver 420 may radiate the sound toward the first rear cavity 4112. The second acoustic driver 430 may be located in the second cavity 412. A front side of the second acoustic driver 430 and the housing 410 may form a second front cavity 4121. A back side of the second acoustic driver 430 and the housing 410 may form a second rear cavity 4122. The front side of the second acoustic driver 430 may radiate the sound toward the second front cavity 4121. The back side of the second acoustic driver 430 may radiate the sound toward the second rear cavity 4122. In some embodiments, the first cavity 411 may be the same as the second cavity 412. The first acoustic driver 420 and the second acoustic driver 430 may be disposed in the first cavity 411 and the second cavity 412, respectively, in a same manner, so that the first front cavity 4111 is the same as the second front cavity 4121, and the first rear cavity 4112 is the same as the second rear cavity 4122, which may make the acoustic impedances of the front side or the back side of the first acoustic driver 420 and the second acoustic driver 430 are the same. In other embodiments, the first cavity 411 and the second cavity 412 may be different. The impedances of the front side or the back side of the first acoustic driver 420 and the second acoustic driver 430 may be the same by changing a size and/or a length of the cavity or increasing a damping. In some embodiments, one or more first sound guide holes 413 may be provided on a side wall of the housing 410 where the first front cavity 4111 is located. The one or more first sound guide holes 413 may be in fluid communication with the first front cavity 4111. The sound output from the front side of the first acoustic driver 420 may be radiated to the outside of the acoustic output device 400 through the one or more first sound guide holes 413. One or more second sound guide holes 414 may be provided on a side wall of the housing 410 where the second front cavity 4121 is located. The one or more second sound guide holes 414 may be in fluid communication with the second front cavity 4121. The sound output from the front side of the second acoustic driver 430 may be radiated to the outside of the acoustic output device 400 through the one or more second sound guide holes 414. In some embodiments, the first sound guide hole 413 and the second sound guide hole 414 may be located on opposite side walls of the housing 410. For example, the first sound guide hole 413 may be located on a side wall of the housing 410 facing the ear of the user, and the second sound guide hole 414 may be located on a side wall of the housing 410 away from the ear of the user. As another example, the first sound guide hole 413 may be located on a side wall of the housing 410 opposite to the front side of the first acoustic driver 420, and the second sound guide hole 414 may be located on a side wall of the housing 410 opposite to the front side of the second acoustic driver 430. In some embodiments, the acoustic output device 400 may not include the first front cavity 4111, the second front cavity 4121, the first rear cavity 4112, or the second rear cavity 4122. For example, the front side of the first acoustic driver 420 and the front side of the second acoustic driver 430 may radiate the sound to the outside directly. That is, the front side of the first acoustic driver 420 and the housing 410 may not form the first front cavity 4111, and the front side of the second acoustic driver 430 and the housing 410 may not form the second front cavity 4121. In some embodiments, the first rear cavity 4112 and the second rear cavity 4122 may be sealed, or may be provided with one or more tuning holes (also referred to as pressure relief holes, which are not shown in FIG. 4) for adjusting an air pressure inside the rear cavity.

In some embodiments, the first acoustic driver 420 and the second acoustic driver 430 may be the same acoustic drivers. The signal processing module may control the front side of the first acoustic driver 420 and the front side of the second acoustic driver 430 to generate sounds with a certain phase and amplitude condition (e.g., sounds with a same amplitude and opposite phases, sounds with different amplitudes and opposite phases, etc.) according to the control signal (e.g., the first electrical signal and the second electrical signal). The sound generated from the front side of the first acoustic driver 420 may be radiated to the outside of the acoustic output device 400 through the first sound guide hole 413. The sound generated from the front side of the second acoustic driver 430 may be radiated to the outside of the acoustic output device 400 through the second sound guide hole 414. The first sound guide hole 413 and the second sound guide hole 414 may be equivalent to a dual sound source outputting sounds in opposite phases. Unlike the case where a dual sound source is constructed by sounds emitted from the front side and the back side of the acoustic driver, sounds in opposite phases may be generated through the front sides of the two acoustic drivers, i.e., the front side of the first acoustic driver 420 and the front side of the second acoustic driver 430, and radiated to the outside through the first sound guide hole 413 and the second sound guide hole 414. When the acoustic impedance from the first acoustic driver 420 to the first sound guide hole 413 is the same or approximately the same as the acoustic impedance from the second acoustic driver 430 to the second sound guide hole 414, sounds emitted from the first sound guide hole 413 and the second sound guide hole 414 in the acoustic output device 400 may be constructed as an effective dual sound source, i.e., the first sound guide hole 413 and the second sound guide hole 414 may emit sounds in opposite phases more accurately. In the far-field, especially in the medium-high frequency band (e.g., 200 Hz-20 kHz), the sound from the first sound guide hole 413 may offset the sound from the second sound guide hole 414 better, which may better suppress the sound leakage of the acoustic output device in the medium-high frequency band to a certain extent. At the same time, the sound generated by the acoustic output device 400 may be prevented from being heard by others near the user, thereby improving the sound leakage reduction effect of the acoustic output device 400.

Further, when the front side of the first acoustic driver 420 and the front side of the second acoustic driver 430 are located on different sides of the housing 410, the first sound guide hole 413 and the second sound guide hole 414 may also be located on different sides of the housing 410, and the housing 410 may act as a baffle between the two sound sources (e.g., the sound emitted from the first sound guide hole 413 and the sound emitted from the second sound guide hole 414). At this time, the housing 410 may separate the first sound guide hole 413 and the second sound guide hole 414, so that an acoustic path from the first sound guide hole 413 to the ear canal of the user and an acoustic path from the second sound guide hole 414 to the ear canal of the user are different. On the one hand, by arranging the first sound guide hole 413 and the second sound guide hole 414 on two sides of the housing 410, a sound path difference between the sound emitted from the first sound guide hole 413 to an ear of the user and a sound emitted from the second sound guide hole 414 to the ear of the user (i.e., a difference between a distance of the sound emitted from the first sound guide hole 413 to the ear canal of the user, and a distance of the sound emitted from the second sound guide hole 414 to the ear canal of the user) may be increased. The effect of sound offset at the ear of the user (i.e., a near-field) may be weakened, thereby increasing the volume of the sound (also be referred to as a near-field sound) heard by the ear of the user, and providing the user with a better listening experience. On the other hand, the housing 410 may have little effect on the sound transmitted by the sound guide hole to the environment, far-field sounds generated by the first sound guide hole 413 and the second sound guide hole 414 may still offset with each other well, which may suppress the sound leakage of the acoustic output device 400 to a certain extent, and may prevent the sound generated by the acoustic output device 400 heard by others near the user at the same time. Therefore, by using the above settings, the listening volume of the acoustic output device 400 in the near field may be improved, and the sound leakage volume of the acoustic output device 400 in the far-field may be reduced.

In some embodiments, the sound output by the first acoustic driver 420 from the first sound guide hole 413 and the sound output by the second acoustic driver 430 from the second sound guide hole 414 may satisfy a specific condition by setting the structures of the first cavity 411 (e.g., the first front cavity 4111 and the first rear cavity 4112) and the second cavity 412 (e.g., the second front cavity 4121 and the second rear cavity 4122). For example, sizes and/or lengths of the first front cavity 4111 and the second front cavity 4112 may be designed, so that a set of sounds with a specific phase relationship (e.g., opposite or approximately opposite phases) can be output from the first sound guide hole 413 and the second sound guide hole 414, which may effectively solve the problems of low listening volume in the near-field and a sound leakage in the far-field of the acoustic output device 400.

It should be noted that the positions of the first cavity 411 and the second cavity 412 in the embodiments of the present disclosure in FIG. 4 are not limited to be vertically arranged up and down relative to the position of the ear of the user as shown in FIG. 4, but can also be obliquely set up and down relative to the position of the ear of the user, laterally and horizontally set relative to the position of the ear of the user, laterally and obliquely set relative to the position of the ear of the user, or the like. The positions of the first cavity 411, the second cavity 412, the first acoustic driver 420, and the second acoustic driver 430 may be adaptively adjusted according to an actual situation, which is not limited herein.

Figure 5:
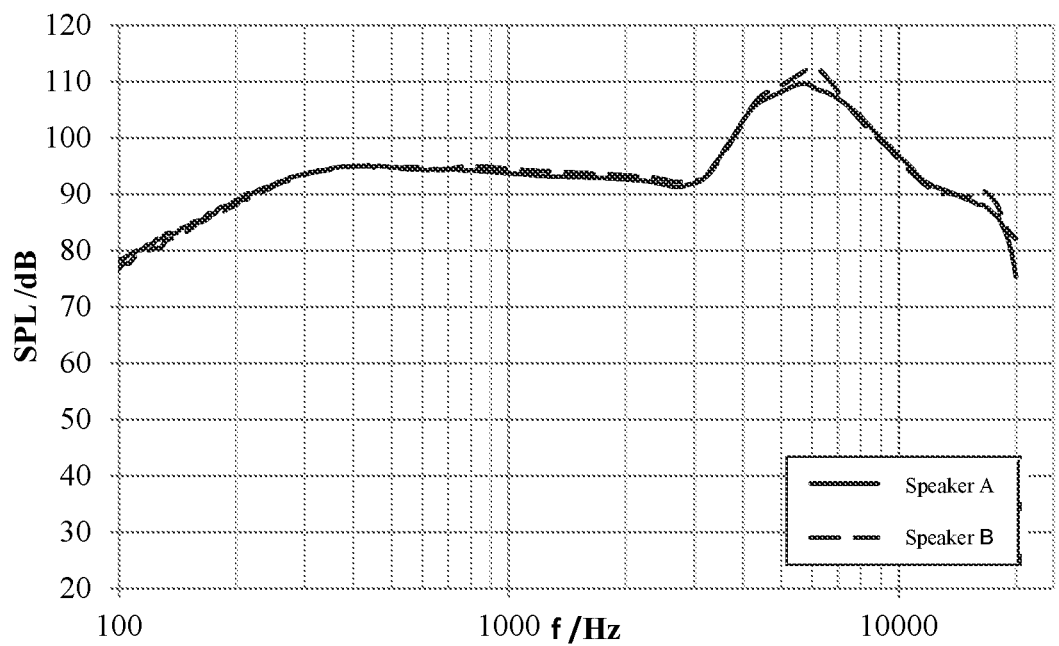
FIG. 5 is a frequency response curve diagram of an acoustic output device when two acoustic drivers of an acoustic output device are the same according to some embodiments of the present disclosure.

FIG. 5 is a frequency response curve diagram of an acoustic output device when two acoustic drivers of the acoustic output device are the same according to some embodiments of the present disclosure. Combined with FIG. 4 and FIG. 5, when the acoustic output device is provided with two identical first acoustic drivers 420 ("speaker A" shown in FIG. 5) and second acoustic drivers 430 ("speaker B" shown in FIG. 5), amplitude frequency responses of the first acoustic driver 420 and the second acoustic driver 430 in the medium-high frequency band (e.g., 200 Hz-8 kHz) and the high frequency band (e.g., greater than 8 kHz) may be approximately the same. The first acoustic driver 420 and the second acoustic driver 430 may emit sounds in opposite phases through the first sound guide hole 413 and the second sound guide hole 414 under the driving of the first electrical signal and the second electrical signal in opposite phases, so that the acoustic output device can construct an effective dual sound source in the medium-high frequency band and the high frequency band. In some embodiments, in order to ensure that the sounds emitted by the first acoustic driver and the second acoustic driver through the corresponding sound guide holes form the effective dual sound source, a difference between amplitude frequency responses of the first acoustic driver and the second acoustic driver in the medium-high frequency band and the high frequency band may be not greater than 6 dB. Preferably, the difference between the amplitude frequency responses of the first acoustic driver and the second acoustic driver in the medium-high frequency band and the high frequency band may be not greater than 5 dB. More preferably, the difference between the amplitude frequency responses of the first acoustic driver and the second acoustic driver in the medium-high frequency band and the high frequency band may be not greater than 4 dB. Further preferably, the difference between the amplitude frequency responses of the first acoustic driver and the second acoustic driver in the medium-high frequency band and the high frequency band may be not greater than 3 dB. In some embodiments, the medium-high frequency band and the high frequency band may be in a specific frequency band range. The specific frequency band range may be 200 Hz-20 kHz.

Figure 6:
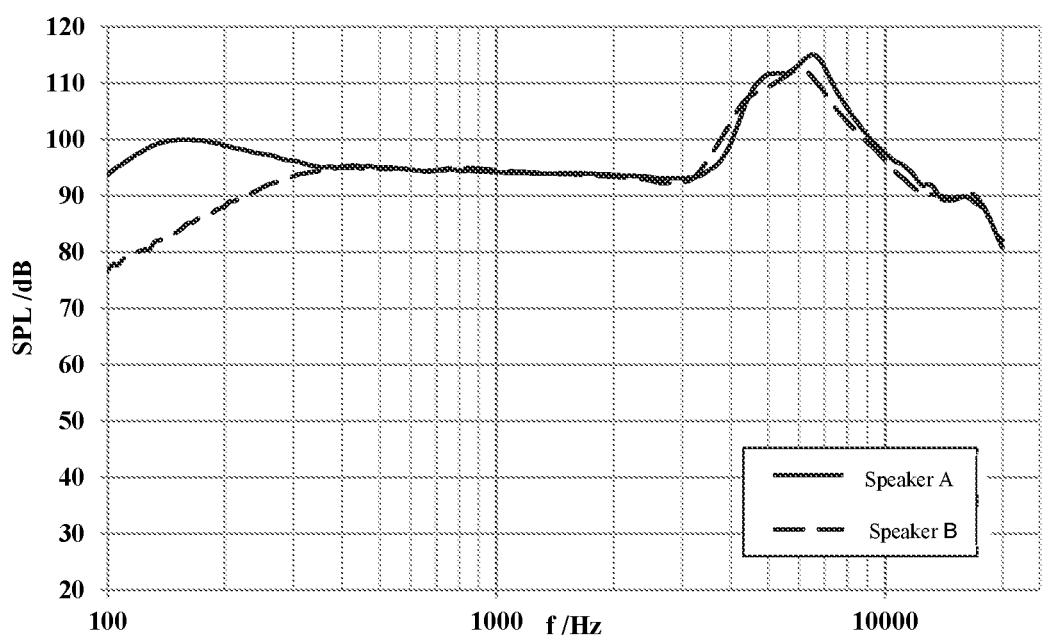
FIG. 6 is a frequency response curve diagram of an acoustic output device when two acoustic drivers of an acoustic output device are different according to some embodiments of the present disclosure.

FIG. 6 is a frequency response curve diagram of an acoustic output device when two acoustic drivers of the acoustic output device are different according to some embodiments of the present disclosure. As shown in FIG. 6, when the acoustic output device is provided with two different first acoustic driver 420 ("speaker A" shown in FIG. 6) and second acoustic driver 430 ("speaker B" shown in FIG. 6), the amplitude frequency responses of the first acoustic driver 420 and the second acoustic driver 430 in the low frequency band (e.g., 100 Hz-200 Hz) may have a certain difference, the amplitude frequency responses of the first acoustic driver 420 and the second acoustic driver 430 in the medium-high frequency band and the high frequency band may be approximately the same.

Considering that sound waves in opposite phases emitted by the first acoustic driver 420 and the second acoustic driver 430 in the low frequency band can offset with each other, in order to improve the acoustic output effect of the acoustic output device in the low frequency range (especially the low frequency output volume of the acoustic output device in the near-field), in some embodiments, a difference between the amplitude frequency responses of the first acoustic driver and the second acoustic driver in at least a portion of the low frequency range (e.g., 100 Hz-200 Hz) may be not less than 10 dB, so that output volumes of the two acoustic drivers in the low frequency range have a large difference. Preferably, the difference between the amplitude frequency responses of the first acoustic driver and the second acoustic driver in at least a portion of the low frequency range may be not less than 15 dB. Further preferably, the difference between the amplitude frequency responses of the first acoustic driver and the second acoustic driver in at least a portion of the low frequency range may be not less than 20 dB. In some embodiments, when the user wears the acoustic output device, the acoustic path from the first acoustic driver 420 to the ear of the user may be smaller than the acoustic path from the second acoustic driver 430 to the ear of the user. Therefore, the volume difference between the low-frequency sound emitted by the first acoustic driver 420 and the low-frequency sound emitted by the second acoustic driver 430 at the ear of the user may further be increased. The offset degree of the low-frequency sounds may be weakened, and the listening volume of the low-frequency sounds at the ear of the user may be increased. In some embodiments, the acoustic path from the acoustic driver to the ear of the user may refer to a distance between a diaphragm to the ear of the user, for example, a distance from the first diaphragm of the first acoustic driver 420 to the ear of the user. In other embodiments, the acoustic path from the acoustic driver to the ear of the user may refer to an acoustic distance from a sound guide hole corresponding to the acoustic driver to the ear of the user, for example, an acoustic distance from the first sound guide hole 413 corresponding to the first acoustic driver 420 to the ear of the user.

In the medium-high frequency band and the high frequency band, the first acoustic driver 420 and the second acoustic driver 430 may emit sounds in opposite phases and in same or similar amplitudes through the first sound guide hole 413 and the second sound guide hole 414, under the driving of the first electrical signal and the second electrical signal in opposite phases, which may enable the acoustic output device to construct an effective dual sound source in the medium-high frequency band and the high frequency band. In some embodiments, in order to ensure that the sounds emitted by the first acoustic driver and the second acoustic driver through the corresponding sound guide holes can form the effective dual sound source in the medium-high frequency band and the high frequency band, the difference between the amplitude frequency responses of the first acoustic driver and the second acoustic driver in the medium-high frequency band and the high frequency band may be not greater than 6 dB. Preferably, the difference between the amplitude frequency responses of the first acoustic driver and the second acoustic driver in the medium-high frequency band and the high frequency band may be not greater than 5 dB. More preferably, the difference between the amplitude frequency responses of the first acoustic driver and the second acoustic driver in the medium-high frequency band and the high frequency band may be not greater than 4 dB. Further preferably, the difference between the amplitude frequency responses of the first acoustic driver and the second acoustic driver in the medium-high frequency band and the high frequency band may be not greater than 3 dB. In some embodiments, the medium-high frequency band and the high frequency band may be in a specific frequency band range. The specific frequency band range may be 200 Hz-20 kHz.

Figure 7:
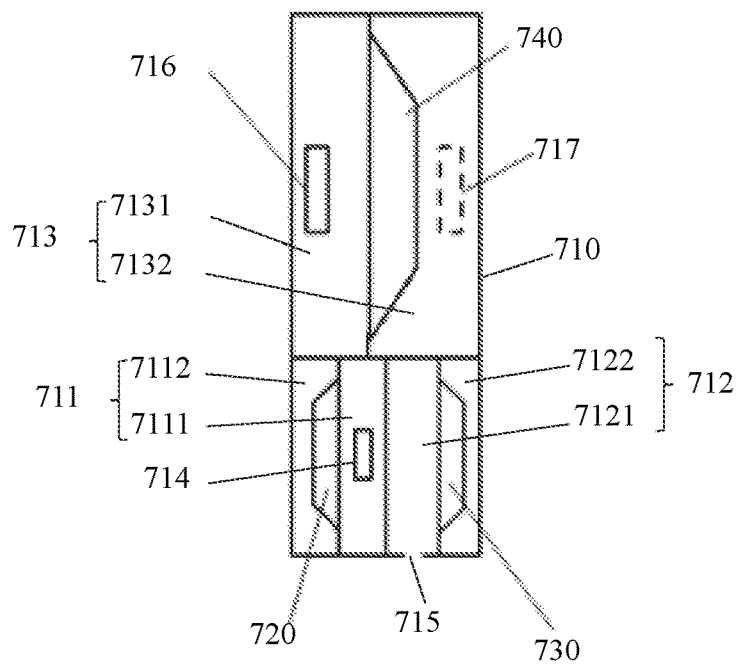
FIG. 7 is a structure diagram illustrating an acoustic output device according to some embodiments of the present disclosure.
Figure 8:
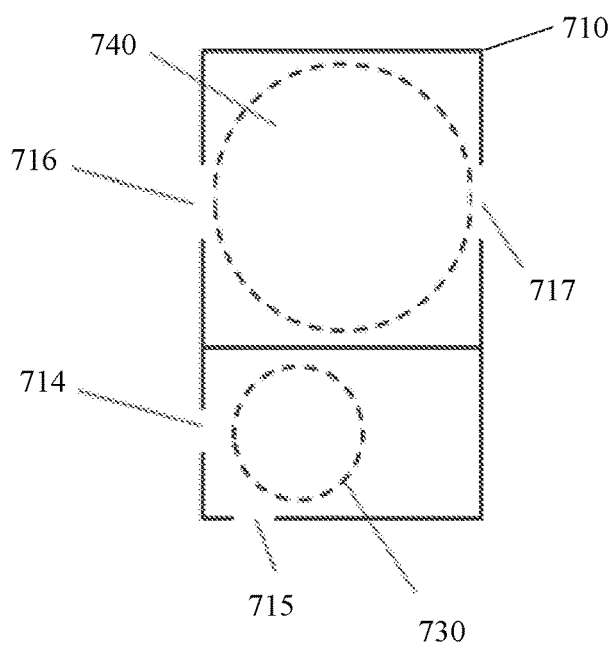
FIG. 8 is another structure diagram illustrating an acoustic output device according to some embodiments of the present disclosure.

FIG. 7 and FIG. 8 are structure diagrams illustrating an acoustic output device according to some embodiments of the present disclosure. As shown in FIG. 7 and FIG. 8, in some embodiments, the acoustic output device 700 may include a first acoustic driver 720, a second acoustic driver 730, a third acoustic driver 740, and a housing 710. The interior of the housing 710 may include a first cavity 711, a second cavity 712, and a third cavity 713 that are not in fluid communication with each other, wherein the first acoustic driver 720 may be located in the first cavity 711, the second acoustic driver 730 may be located in the second cavity 712, and the third acoustic driver 740 may be located in the third cavity 713. The front side of the first acoustic driver 720 and the housing 710 may form a first front cavity 7111. The back side of the first acoustic driver 720 and the housing 720 may form a first rear cavity 7112. The front side of the first acoustic driver 720 may radiate the sound toward the first front cavity 7111. The back side of the first acoustic driver 720 may radiate the sound toward the first rear cavity 7112. The front side of the second acoustic driver 730 and the housing 710 may form a second front cavity 7121. The back side of the second acoustic driver 730 and the housing 710 may form a second rear cavity 7122. The front side of the second acoustic driver 730 may radiate the sound toward the second front cavity 7121. The back side of the second acoustic driver 730 may radiate the sound toward the second rear cavity 7122. The front side of the third acoustic driver 740 and the housing 710 may form a third front cavity 7131. The back side of the third acoustic driver 740 and the housing 710 may form a third rear cavity 7132. The front side of the third acoustic driver 730 may radiate the sound toward the third front cavity 7131. The back side of the third acoustic driver 740 may radiate the sound toward the third rear cavity 7122. In some embodiments, one or more first sound guide holes 714 may be provided on a side wall of the housing 710 where the first front cavity 7111 is located. The one or more first sound guide holes 714 may be in fluid communication with the first front cavity 7111. The sound output from the front side of the first acoustic driver 720 may be radiated to the outside of the acoustic output device 700 through the one or more first sound guide holes 714. One or more second sound guide holes 715 may be provided on a side wall of the housing 710 where the second front cavity 7121 is located. The one or more second sound guide holes 715 may be in fluid communication with the second front cavity 712. The sound output from the front side of the second acoustic driver 730 may be radiated to the outside of the acoustic output device 700 through the one or more second sound guide holes 715. In some embodiments, the first sound guide hole 714 and the second sound guide hole 715 may be located on different side walls of the housing 710. For example, the first sound guide hole 714 and the second sound guide hole 715 may be located on adjacent side walls of the housing 710, respectively. As another example, the first sound guide hole 714 and the second sound guide hole 715 may be located on opposite side walls of the housing 710, respectively. One or more third sound guide holes 716 may be provided on a side wall of the housing 710 where the third front cavity 7131 is located. The one or more third sound guide holes 715 may be in fluid communication with the third front cavity 7131. The sound output from the front side of the third acoustic driver 740 may be radiated to the outside of the acoustic output device 700 through the one or more third sound guide holes 716. One or more fourth sound guide holes 717 may be provided on a side wall of the housing 710 where the third rear cavity 7132 is located. The one or more fourth sound guide holes 717 may be in fluid communication with the fourth rear cavity 7132. The sound output from the back side of the third acoustic driver 740 may be radiated to the outside of the acoustic output device 700 through the one or more fourth sound guide holes 717. In some embodiments, the third sound guide hole 716 and the fourth sound guide hole 717 may be located on different side walls of the housing 710. For example, the third sound guide hole 716 and the fourth sound guide hole 717 may be located on adjacent side walls of the housing 710, respectively. As another example, the third sound guide hole 716 and the fourth sound guide hole 717 may be located on opposite side walls of the housing 710, respectively.

In some embodiments, the first acoustic driver 720 and the second acoustic driver 730 may be medium-high frequency acoustic drivers, and the third acoustic driver 740 may be a low frequency acoustic driver. The first acoustic driver 720 and the second acoustic driver 730 may emit sound waves in opposite phases under the control of the first electrical signal and the second electrical signal in opposite phases. The third acoustic driver 740 may filter out a middle-high frequency component in the first electrical signal or the second electrical signal through a filter/filter group, and only output a low-frequency sound. Further, the third acoustic driver 730 may output sound waves in opposite phases through the third sound guide hole 716 and the fourth sound guide hole 717. For illustration purposes, when the user wears the acoustic output device 700, the first sound guide holes 714 and the third sound guide holes 716 may face the ear of the user, the second sound guide hole 715 may face the ear of the user or away from the ear of the user, and the fourth sound guide hole 717 may away from the ear of the user. In some embodiments, a phase of a sound emitted from one of the third sound guide hole 716 and the fourth sound guide hole 717 which is closer to the ear of the user may be the same as a phase of a sound emitted from the one of the first sound guide hole 714 and the second sound guide hole 715 which is closer to the ear of the user. It should be noted that phases of sounds emitted from different sound guide holes close to the ear of the user may be the same, so that the sounds emitted from the different sound guide holes can be superimposed, thereby increasing a listening volume at the ear of the user. In a position (e.g., a far-field) far from the ear of the user, sound waves emitted from the different sound guide holes (e.g., the first sound guide hole 714 and the second sound guide hole 715, the third sound guide hole 716 and the fourth sound guide hole 717) may offset with each other due to their opposite phases, thereby reducing the sound leakage volume of the acoustic output device in the far-field. In some embodiments, by setting the structure of the first cavity 711 (e.g., the first front cavity 7111 and the first rear cavity 7112)/the second cavity 712 (e.g., the second front cavity 7121 and the second rear cavity 7122) and the structure of the third cavity 713 (e.g., the third front cavity 7131 and the third rear cavity 7132), the sound output by the first acoustic driver 720 from the first sound guide hole 714, the sound output by the second acoustic driver 730 from the second acoustic guide hole 715, or the sound output by the third acoustic driver 740 from the third sound guide hole 716 or the fourth sound guide hole 717 may satisfy a certain condition. For example, sizes and/or lengths of the first front cavity 4111 and the third front cavity 7131 may be designed, so that a group of sounds in the same phase can be output from the first sound guide hole 413 and the second sound guide hole 414.

In some embodiments, since a wavelength of a sound in the low frequency band is longer than a wavelength of a sound in the medium-high frequency band or the high frequency band, in order to reduce the offset degree of sounds emitted by the third acoustic driver 740 from the third sound guide hole 716 and the fourth sound guide hole 717 near the ear of the user, a sound path difference between a sound emitted from the third sound guide hole 716 to the ear of the user and a sound emitted from the fourth sound guide hole 717 to the ear of the user may be greater than a sound path difference between a sound emitted from the first sound guide hole 714 to the ear of the user and a sound emitted from the second sound guide hole 715 to the ear of the user.

In some embodiments, the acoustic output device 700 shown in FIG. 7 and FIG. 8 may not only reduce the sound leakage volume in the medium-high frequency band in the far-field, and improve the listening effect of the sound in the low frequency band, but also can be applied to a high noise environment. Merely by way of example, in the high noise environment, the far-field sound leakage may not be easily heard by others near the user, when the first acoustic driver 720 and the second acoustic driver 730 are both medium-high frequency acoustic drivers, the phases of the first electrical signal and the second electrical signal may be adjusted to be the same by closing a phase inverter circuit, so that a phase of a medium-high frequency sound output by the first acoustic driver 720 through the first sound guide hole 714 is the same as a phase of a medium-high frequency sound output by the second acoustic driver 730 through the second sound guide hole 715, thereby improving the output volume of the acoustic output device in the medium-high frequency band. As another example, in the high noise environment, when the first acoustic driver 720 and the second acoustic driver 730 are medium-high frequency acoustic drivers, and the third acoustic driver 740 is a low frequency acoustic driver, a filter/filter group electrically connected to the third acoustic driver 730 may be turned off, so that the third acoustic driver 730 can also generate a sound wave in the medium-high frequency band according to the control signal. The sound wave may radiate toward or away from the ear of the user through the third sound guide hole 716 and the fourth sound guide hole 717, which may increase the volume of the sound in the medium-high frequency band output by the acoustic output device. In other embodiments, by controlling the filter/filter group of the third acoustic driver 740, a frequency division may be performed on a control signal (e.g., the third electrical signal) for controlling the third acoustic driver 740. The signal processing module may adjust a phase of a low-frequency signal obtained after the frequency division, so that a low frequency sound wave generated by the third acoustic driver 740 is radiated to the outside through the third sound guide hole 716 and the fourth sound guide hole 717. A phase of the sound wave emitted by the third sound guide hole 716 and the fourth sound guide hole 717 radiated to the outside may be opposite to a phase of the low-frequency noise in the external noise, which may achieve an effect of actively reducing the low frequency noise. In addition, the medium-high frequency signal obtained after the frequency division may make the third acoustic driver 740 generate the medium-high frequency sound. The medium-high frequency sound may have the same phase as or have a small phase difference (e.g., not greater than 90°) with the medium-high frequency sound generated by the first acoustic driver 720 and the second acoustic driver 730, to achieve an effect of noise reduction in the low frequency band and an effect of increasing the output volume in the high frequency band at the same time.

It should be noted that a number of acoustic drivers is not limited to three, but may also be four, five, or the like. The number of acoustic drivers and corresponding sound parameters (e.g., a phase, a frequency, and/or an amplitude) may be adjusted according to an actual need, which is not limited herein. The specific structure of the acoustic driver may refer to FIG. 1 of the present disclosure and descriptions thereof. The first/second/third acoustic drivers described in FIG. 7 and FIG. 8 may be the same as or similar to the first/second/third acoustic drivers described in FIG. 3, FIG. 4 and descriptions thereof.

Having thus described the basic concepts, it may be rather apparent to those skilled in the art after reading this detailed disclosure that the foregoing detailed disclosure is intended to be presented by way of example only and is not limiting. Various alterations, improvements, and modifications may occur and are intended to those skilled in the art, though not expressly stated herein. These alterations, improvements, and modifications are intended to be suggested by this disclosure and are within the spirit and scope of the exemplary embodiments of this disclosure.

Moreover, certain terminology has been used to describe embodiments of the present disclosure. For example, the terms "one embodiment," "an embodiment," and/or "some embodiments" mean that a particular feature, structure, or characteristic described in connection with the embodiment is included in at least one embodiment of the present disclosure. Therefore, it is emphasized and should be appreciated that two or more references to "an embodiment" or "one embodiment" or "an alternative embodiment" in various portions of this specification are not necessarily all referring to the same embodiment. Furthermore, the particular features, structures, or characteristics may be combined as suitable in one or more embodiments of the present disclosure.

In addition, those skilled in the art may understand that various aspects of the present disclosure may be illustrated and described through several patentable categories or situations, including any new and useful processes, machines, products, or combinations of materials, or any new and useful improvements. Accordingly, all aspects of the present disclosure may be performed entirely by hardware, may be performed entirely by software (including firmware, resident software, microcode, etc.), or may be performed by a combination of hardware and software. The above hardware or software can be referred to as "data block", "module", "engine", "unit", "component" or "system". In addition, aspects of the present disclosure may appear as a computer product located in one or more computer-readable media, the product including computer-readable program code.

The computer storage medium may include a propagation data signal containing a computer program encoding, such as on a baseband or as part of a carrier. The propagation signal may have a variety of expressions, including electromagnetic form, optical form, etc., or suitable combinations. The computer storage medium may be any computer readable medium other than the computer readable storage medium, which may perform system, devices, or devices to implement system, devices, or devices to implement communication, propagating, or devices, by connecting to an instruction. Program encoding on a computer storage medium may be propagated by any suitable medium, including radio, cable, fiber optic cable, RF, or a similar medium, or a combination of the above media.

Computer program code for carrying out operations for aspects of the present disclosure may be written in any combination of one or more programming languages, including an object oriented programming language such as Java, Scala, Smalltalk, Eiffel, JADE, Emerald, C++, C#, VB. NET, Python, or the like, conventional procedural programming languages, such as the "C" programming language, Visual Basic, Fortran 2003, Perl, COBOL 2002, PHP, ABAP, dynamic programming languages such as Python, Ruby, and Groovy, or other programming languages. The program code may be run entirely on the user's computer, or as an independent software package on the user's computer, or partly on the user's computer and partly on a remote computer, or entirely on the remote computer or server. In the latter case, the remote computer may be connected to the user's computer through any network form, such as a local area network (LAN) or a wide area network (WAN), or to an external computer (for example, via the Internet), or in a cloud computing environment, or as a service such as a Software as a Service (SaaS).

In addition, unless clearly stated in the claims, the order of processing elements and sequences, the use of numbers and letters, or the use of other names in the present disclosure are not used to limit the order of the procedures and methods of the present disclosure. Although the above disclosure discusses through various examples what is currently considered to be a variety of useful embodiments of the disclosure, it is to be understood that such detail is solely for that purpose, and that the appended claims are not limited to the disclosed embodiments, but, on the contrary, are intended to cover modifications and equivalent arrangements that are within the spirit and scope of the disclosed embodiments. For example, although the implementation of various components described above may be embodied in a hardware device, it may also be implemented as a software only solution, e.g., an installation on an existing server or mobile device.

Similarly, it should be appreciated that in the foregoing description of embodiments of the present disclosure, various features are sometimes grouped together in a single embodiment, figure, or description thereof for the purpose of streamlining the disclosure aiding in the understanding of one or more of the various embodiments. However, this disclosure does not mean that the present disclosure object requires more features than the features mentioned in the claims. Rather, claimed subject matter may lie in less than all features of a single foregoing disclosed embodiment.

In some embodiments, the numbers expressing quantities of ingredients, properties, and so forth, used to describe and claim certain embodiments of the application are to be understood as being modified in some instances by the term "about," "approximate," or "substantially". Unless otherwise stated, "about," "approximate," or "substantially" may indicate ±20% variation of the value it describes. Accordingly, in some embodiments, the numerical parameters set forth in the description and attached claims are approximations that may vary depending upon the desired properties sought to be obtained by a particular embodiment. In some embodiments, the numerical parameters should consider specified significant digits and adopt ordinary rounding techniques. Notwithstanding that the numerical ranges and parameters configured to illustrate the broad scope of some embodiments of the present disclosure are approximations, the numerical values in specific examples may be as accurate as possible within a practical scope.

Contents of each of patents, patent applications, publications of patent applications, and other materials, such as articles, books, specifications, publications, documents, etc., referenced herein are hereby incorporated by reference, excepting any prosecution file history that is inconsistent with or in conflict with the present document, or any file (now or later associated with the present disclosure) that may have a limiting effect to the broadest scope of the claims. It should be noted that if the description, definition, and/or terms used in the appended materials of the present disclosure is inconsistent or conflicts with the content described in the present disclosure, the use of the description, definition and/or terms of the present disclosure shall prevail.

Finally, it should be understood that the embodiments described in the present disclosure merely illustrates the principles of the embodiments of the present disclosure. Other modifications may be within the scope of the present disclosure. Accordingly, by way of example, and not limitation, alternative configurations of embodiments of the present disclosure may be considered to be consistent with the teachings of the present disclosure. Accordingly, the embodiments of the present disclosure are not limited to the embodiments explicitly introduced and described by the present disclosure.

What is claimed is:

1. An acoustic output device, comprising:
   a first acoustic driver including a first diaphragm;
   a second acoustic driver including a second diaphragm;
   a control circuit electrically connected with the first acoustic driver and the second acoustic driver respectively, wherein
      the control circuit provides a first electrical signal for driving a vibration of the first diaphragm, and a second electrical signal for driving a vibration of the second diaphragm, and a phase of the first electrical signal and a phase of the second electrical signal are opposite;
   a housing supporting the first acoustic driver and the second acoustic driver, wherein
      a sound generated by the vibration of the first diaphragm is radiated outward through a first sound guide hole on the housing, and a sound generated by the vibration of the second diaphragm is radiated outward through a second sound guide hole on the housing; and
   a third acoustic driver including a third diaphragm, wherein
      the control circuit provides a third electrical signal for driving a vibration of the third diaphragm to generate a low-frequency sound, and
      the low-frequency sound is radiated outward through a third sound guide hole and a fourth sound guide hole on the housing,
      wherein a sound path difference between a sound emitted from the third sound guide hole to an ear of a user and a sound emitted from the fourth sound guide hole to the ear of the user is greater than a sound path difference between a sound emitted from the first sound guide hole to the ear of the user and a sound emitted from the second sound guide hole to the ear of the user.

2. The acoustic output device of claim 1, wherein
   the first acoustic driver includes a first magnetic circuit structure, the second acoustic driver includes a second magnetic circuit structure, and
   when the first diaphragm is driven by the first electric signal to vibrate toward the first magnetic circuit structure, the second diaphragm is driven by the second electrical signal to vibrate away from the second magnetic circuit structure.

3. The acoustic output device of claim 2, wherein
   the housing at least includes a first cavity and a second cavity, wherein the first cavity is the same as the second cavity, the first cavity is not in fluid communication with the second cavity,
   the first acoustic driver is located in the first cavity, and the second acoustic driver is located in the second cavity.

4. The acoustic output device of claim 3, wherein
a front cavity of the first acoustic driver is the same as a front cavity of the second acoustic driver, and
a rear cavity of the first acoustic driver is the same as a rear cavity of the second acoustic driver.

5. The acoustic output device of claim 3, wherein
the first sound guide hole is in fluid communication with the first cavity, the second sound guide hole is in fluid communication with the second cavity;
the first acoustic driver emits the sound from the first sound guide hole, the second acoustic driver emits the sound from the second sound guide hole; and
a phase of the sound emitted by the first acoustic driver from the first sound guide hole is opposite to a phase of the sound emitted by the second acoustic driver from the second sound guide hole.

6. The acoustic output device of claim 1, wherein the first sound guide hole and the second sound guide hole are located on adjacent side walls or opposite side walls of the housing.

7. The acoustic output device of claim 1, wherein
the control circuit generates an audio signal, and
the first acoustic driver and the second acoustic driver receive the audio signal in opposite polarities, respectively, to obtain the first electrical signal and the second electrical signal, respectively.

8. The acoustic output device of claim 1, wherein
the first acoustic driver and the second acoustic driver are electrically connected with the control circuit in a same polarity, respectively, and
the first acoustic driver or the second acoustic driver is electrically connected with the control circuit through a phase inverter circuit.

9. The acoustic output device of claim 1, wherein a difference between an amplitude frequency response of the first acoustic driver and an amplitude frequency response of the second acoustic driver in a medium-high frequency range is not greater than 6 dB.

10. The acoustic output device of claim 9, wherein the medium-high frequency range is within 200 Hz to 20 kHz.

11. The acoustic output device of claim 9, wherein a difference between the amplitude frequency response of the first acoustic driver and the amplitude frequency response of the second acoustic driver in at least a portion of the low frequency range is not less than 10 dB.

12. The acoustic output device of claim 1, wherein a rear cavity of the first acoustic driver and a rear cavity of the second acoustic driver include at least one tuning hole.

13. The acoustic output device of claim 1, wherein the third sound guide hole and the fourth sound guide hole are located on adjacent side walls or opposite side walls of the housing.

14. The acoustic output device of claim 1, wherein the third sound guide hole and the fourth sound guide hole are used to guide a sound of the front cavity of the third acoustic driver and a sound of the rear cavity of the third acoustic driver, respectively.

15. The acoustic output device of claim 14, wherein a phase of a sound emitted from one of the third sound guide hole and the fourth sound guide hole which is closer to an ear of a user is the same as a phase of a sound emitted from one of the first sound guide hole and the second sound guide hole which is closer to the ear of the user.

16. The acoustic output device of claim 1, wherein a physical size of the third acoustic driver is greater than a physical size of the first acoustic driver or a physical size of the second acoustic driver.

17. The acoustic output device of claim 1, wherein an area of the third diaphragm of the third acoustic driver is greater than an area of the first diaphragm of the first acoustic driver or an area of the second diaphragm of the second acoustic driver.

* * * * *